US010205695B2

(12) United States Patent
Snider et al.

(10) Patent No.: US 10,205,695 B2
(45) Date of Patent: Feb. 12, 2019

(54) SYSTEMS AND METHODS FOR IMPLEMENTING INTELLIGENT CHAT COMMUNICATION WITHIN AN EMAIL ENVIRONMENT

(71) Applicant: Notion AI, Inc., Ann Arbor, MI (US)

(72) Inventors: Lindsay Snider, Ann Arbor, MI (US); Guy Suter, Ann Arbor, MI (US); Ian Berry, Ann Arbor, MI (US)

(73) Assignee: Notion AI, Inc., Ann Arbor, MI (US)

( * ) Notice: Subject to any disclaimer, the term of this patent is extended or adjusted under 35 U.S.C. 154(b) by 0 days.

(21) Appl. No.: 15/995,865

(22) Filed: Jun. 1, 2018

(65) Prior Publication Data

US 2018/0351901 A1    Dec. 6, 2018

Related U.S. Application Data

(60) Provisional application No. 62/514,385, filed on Jun. 2, 2017.

(51) Int. Cl.
| | | |
|---|---|---|
| *G06F 15/16* | (2006.01) | |
| *H04L 12/58* | (2006.01) | |
| *G06K 9/62* | (2006.01) | |
| *G06F 15/18* | (2006.01) | |

(52) U.S. Cl.
CPC .............. *H04L 51/22* (2013.01); *G06F 15/18* (2013.01); *G06K 9/628* (2013.01); *H04L 51/16* (2013.01); *H04L 51/24* (2013.01)

(58) Field of Classification Search
USPC ....... 709/203, 204, 206, 217, 219, 223, 224, 709/226, 228, 232, 238; 705/14.45; 455/466
See application file for complete search history.

(56) References Cited

U.S. PATENT DOCUMENTS

| | | | | |
|---|---|---|---|---|
| 6,898,631 | B1 * | 5/2005 | Kraft ................... | H04L 12/1831 709/224 |
| 2013/0232159 | A1 * | 9/2013 | Daya ..................... | G06Q 50/01 709/204 |
| 2014/0155111 | A1 * | 6/2014 | Yang ..................... | G06F 3/0486 455/466 |
| 2016/0379269 | A1 * | 12/2016 | Ellis ................... | G06Q 30/0269 705/14.45 |
| 2017/0111341 | A1 * | 4/2017 | Huh .................. | G06F 17/30876 |

* cited by examiner

*Primary Examiner* — Quang N Nguyen
(74) *Attorney, Agent, or Firm* — Jeffrey Schox; Padowithz Alce

(57) ABSTRACT

An online system and an online method that enables intelligent chat messaging within an email environment based on email communication data includes collecting by an email integration server email communication data relating to an inbound email communication; extracting by one or more processing circuits chat data features from the email communication data; providing the extracted chat data features, as input, into a chat messaging circuit; using the extracted chat data features to generate by the chat messaging circuit chat communication parameters that define one or more configurations for a chat communication relating to the inbound email communication; and implementing the chat communication within the email environment based on the generated chat communication parameters.

18 Claims, 6 Drawing Sheets

200

Pulling Inbound Email S202

Generating Overlay Data S204

Initiating a Chat Communication S210

Identifying Chat Parameters S220

Transmitting & Storing Chat S230

Implementing Chat Session S240

SYSTEMS AND METHODS FOR IMPLEMENTING INTELLIGENT CHAT COMMUNICATION WITHIN AN EMAIL ENVIRONMENT

CROSS-REFERENCE TO RELATED APPLICATIONS

This application claims the benefit of U.S. Provisional Application No. 62/514,385, filed 2 Jun. 2017, which is incorporated in its entirety by this reference.

TECHNICAL FIELD

These inventions relate generally to the electronic communication processing and online communication interfaces, and more specifically to new and useful online communication interfaces with intelligent chat communication integration in the electronic communication processing and online communication interfaces field.

BACKGROUND

In many modern contexts, electronic mail (email) is an often-utilized means, if not primary means, of communicating electronically. Now that e-mail communications may be composed and transmitted via numerous communication devices (e.g., mobile phones, wearable devices (e.g., watches), virtual assistive devices, etc.) other than desktops, the amount of e-mail communications received by any given recipient on a single day may easily exceed several hundred emails and probably more than one thousand emails per day. The numerous amount of emails received each day coupled with the additional responses made to some of these emails can overwhelm a user's email account or a viewing device displaying the emails. Specifically, the numerous amount of emails may often overwhelm a user's ability to digest important and/or time-sensitive emails. This, in turn, may cause the user to lose productivity, make mistakes, and/or mishandle one or more important matters.

Additionally, while some email service providers may include chat functionality, the chat functionality operates independently of email processing, operation, and overall functionality. That is, the email communication does not inform an operation of the chat functionality.

Thus, there is a need in the electronic communication processing and electronic mail interface field to create new and useful systems and methods for reducing email communications and preserving computing resources. Further, there is a need to integrate chat functionality with email functionality such that characteristics of email may function to govern an instantiation and/or an operation of one or more features chat messaging within an electronic communication environment. The embodiments of the present application provide such new and useful systems and methods.

DESCRIPTION OF THE PREFERRED EMBODIMENTS

The following description of the preferred embodiments of the present application is not intended to limit the inventions to these preferred embodiments, but rather to enable any person skilled in the art to make and use these inventions.

1. System for Implementing Intelligent Chat Communication

Figure 1:
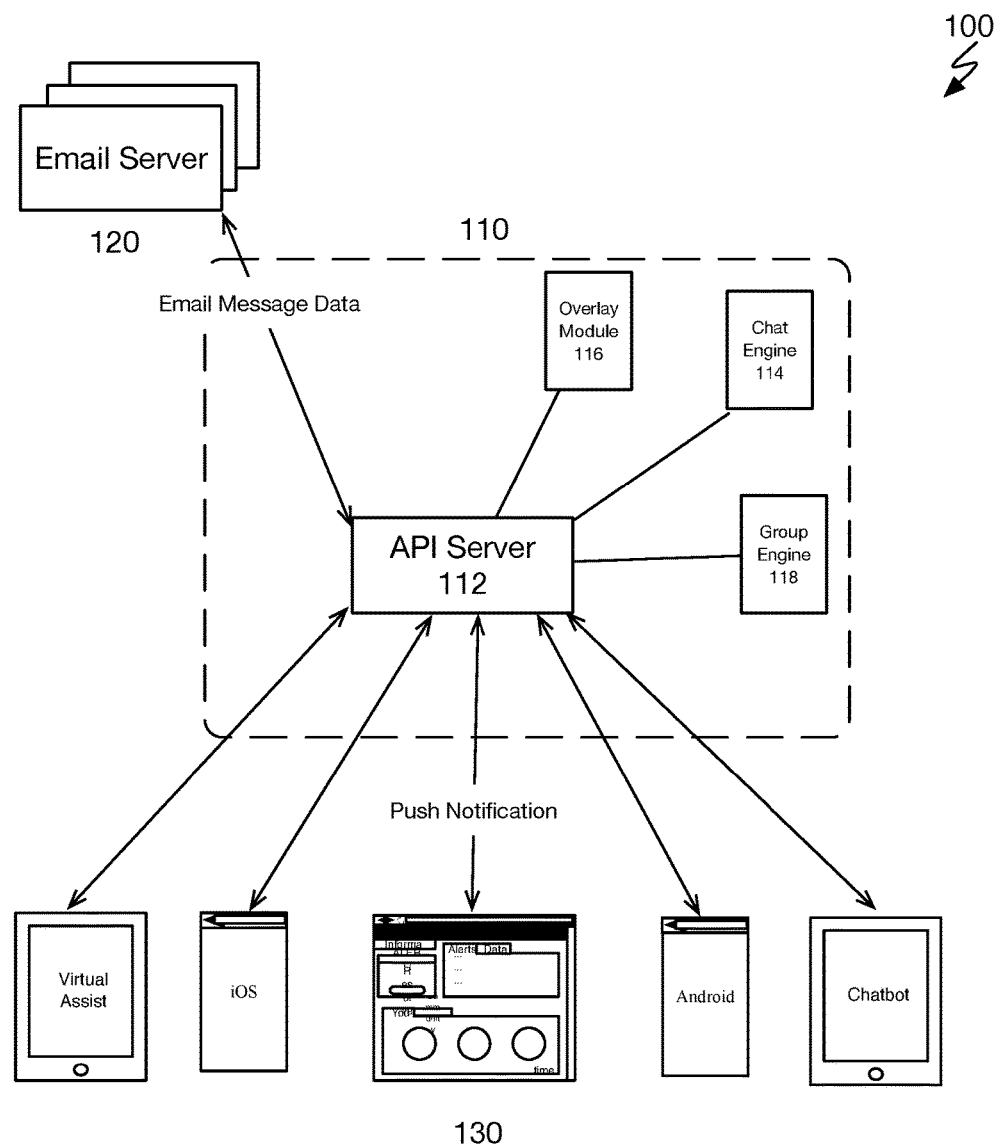
FIG. 1 illustrates a system 100 in accordance with one or more embodiments of the present application.

As shown in FIG. 1, a system 100 for generating an email communication with intelligent chat messaging functionality includes a plurality of mail servers 120, a plurality of client devices 130, and email integration platform 11o having an email integration server 112, a chat engine 114, an overlay module 116, and a grouping engine 118.

The system 100 functions to implement the email integration platform 110 to ingest email communication from a disparate and remote mail server (e.g., one of the plurality of mail servers 120). The email communication may include an email message from a sender to a recipient (or from a first email client to a second email client) having an email body having content, such as text, images, video, etc., an email header, and the like. The email integration platform 110 functions to transform the email communication into a format useable by a client device (e.g., user mobile device) application or client device operating with a web browser or the like. The transformation of the email communication overlays several features, functionalities, and metadata into the email communication allowing a recipient to interact with the email communication in one or more dispositive manners and the like. The email integration platform 110 preferably integrates chat communication functionality with the email communication or within the client device application.

It shall be noted that while preferred embodiments of the present application generally function to receive, process, and send email communications, the systems and methods described herein may additionally function to be implemented with any type or kind of electronic message.

Accordingly, the email integration server 112 of the platform 110 preferably functions to extract email communications from the plurality of mail servers 120. In many embodiments, the email integration server 112 functions as a proxy server (or API server) capable of interfacing with a plurality of email servers for directing email communications to and from the plurality of email servers to corresponding user email accounts and client devices. The email communications extracted from the mail servers 120 may be associated with one or more user accounts (subscribing accounts) or one or more user devices configured to transmit and receive electronic mail communications using the email integration platform 110.

The email integration server 112 may extract email communications on a periodic or continuous basis. Additionally, or alternatively, the email integration server 112 may extract email communications based on a request by a user client device or an indication by the plurality of mail servers 120 that email communications are available for extraction. Additionally, or alternatively, the email integration server 112 may automatically receive email communications from the plurality of mail servers 120 without expressly making an extraction request or the like. The automatic transmission of email communications from the plurality of mail servers 120 to the email integration server 112 may be based on a predetermined or dynamic schedule negotiated between the email integration server 112 and each of the plurality of mail servers 120.

Additionally, the email integration server 112 in cooperation with the overlay module 116 preferably function to generate overlay data for an email communication and, functions to store the generated overlay data for the email communication. Preferably, the email integration server 112 functions to permanently store the overlay data so long as the associated email communication persists within the mail server (e.g., mail servers 120).

Upon receipt by the email integration server 112 of an email communication request (e.g., request for email list of a recipient user) from one or more of the plurality of user devices 130, the email integration server 112 functions to pull or extract email communications from the plurality of mail servers 120. Specifically, the email communication request from the user devices 130 may include user identification information that allows the email integration server 112 to correspond the user identification information to an email communication account at the one or more of the plurality of mail servers 120.

Once the email integration server 112 receives the email communications from the plurality of mail servers 120, the email integration server 112 functions to generate overlay data for the email communications and join or integrate the generated overlay data to the email communications thereby generating integrated email communications. Following, the email integration server 112 functions transmits the integrated email communication via a communication network to a client device 130 of the recipient user requesting the email communications.

The email integration server 112 may include one or more computing servers. Additionally, or alternatively, the email integration server 112 and associated chat engine 114 and the like may be implemented via a distributed computing network (e.g., the cloud). It shall be noted that while, the email integration server 112 is preferably implemented and maintained by a separate entity different from an entity (or service) maintaining the plurality of mails servers 120, in some embodiments, the email integration server 112 and mail servers 120 may be maintained or implemented by a same entity or may be combined into a single computing server (or platform).

The chat engine 114 preferably includes one or more chat communication computing servers (client-servers) and a chat communication database. The chat engine 114 preferably functions to enable chat communication via an email environment (or any suitable networked computer environment) deployed via a client computing device. The chat engine 114 also functions to use the chat communication server to generate chat communication parameters for each email communication extracted from the plurality of mail server 120. Additionally, the chat engine 114 may function to utilize the chat database to store chat data including chat communication parameters, initial chat communication requests, ongoing chat communications, chat content exchanged during a chat session, extracted email communication features, and the like. Additionally, or alternatively, the chat communications data stored within the chat database may be encrypted for security and privacy of the content therein. The chat database may function to encrypt the chat communications stored therein in any suitable manner including using asymmetric and/or symmetric cryptographic key schemes. For instance, in some embodiments, in order to decrypt and retrieve chat communications data a requestor or user of the data must present a public cryptographic key or a shared cryptographic key to the chat database, which may use the key to decrypt and retrieve the chat communications data. The chat engine 114 may also function to enable searching of stored and/or historical chat communication by either the initiator of the stored chat communication(s) or by one of the participants of the chat communication message.

Additionally, or alternatively one or more of the email integration server 112 and the chat engine 114 may function to perform content analysis of inbound and/or outbound email communications data preferably for purposes of setting chat communication parameters and/or instantiating a chat or a proposed chat communication session between a plurality of client user devices or the like.

In a preferred embodiment one or more of the email integration server 112 and the chat engine 114 may function to analyze a content of email communication data and use the results of the analysis of the email communication data to derive one or more chat communication parameters. In some embodiments, the analysis of the email communication data may be performed by a disparate server, system, or processing circuit (e.g., data analysis engine) that works in cooperation with one or more of the email integration server 112 and the chat engine 114. Preferably, the email integration server 112 or the chat engine 114 functions to implement a (chat) feature extractor that preferably operates to extract one or more features from the email communications data and provide these features as input into the chat engine 114 to derive chat communication parameters and the like.

The feature extractor may be configured to extractor any type or kind of suitable feature(s) from the email communication data including, but not limited to, email header data, email content data, email metadata (time sent, or time received, IP address, etc.) email recipient data or email sender data (e.g., user or device profile data) and the like.

In one implementation, the feature extractor comprises either a processing circuit or a feature extraction server that implements predefined (chat feature) data filters that operate to receive email communication data as input and output only those features that the data filter is configured to or designed to allow through or capture. Accordingly, in this implementation, the system 100 may include a plurality of predefined data filters where each of the plurality of predefined data filters may be configured to filter through a specific data type or feature of email communication data. For instance, a first data filter may function to filter only a subject matter or topic from content or a subject of the email communication data and a second data filter may function to filter IP address data of a sender of the email communication associated with the email communication data. It shall be noted, however, that while in the preferred embodiment, the data filters may function to filter or extract one type of kind of data or feature from email communication data, it shall be noted that the data filters may operate to filter multiple types or kinds of data or features from email communication data, in some embodiments.

In a second implementation, the system 100 may function to implement the feature extractor using an ensemble of machine learning classifiers. In this implementation, the ensemble of machine learning classifiers may include a plurality of distinct machine learning classifiers that may function to work together to extract data or features from email communication data. In a preferred embodiment, each of the plurality of distinct machine learning classifiers may be trained to detect and classify one or more specific features and correspondingly, generate a classification label for the one or more specific features when detected by the machine learning classifier. For instance, each of the plurality of distinct machine learning classifiers may function to receive email communication data as input and output a classification label when a distinct feature is detected within the email communication data. Additionally, the classification labels generated by the machine learning classifiers and associated data feature may be extracted and provided as input into the chat engine 114. Using the extracted email communication data features and associated classification labels, the chat engine 114 may function to generate one or more chat communication parameters, instantiate a specifically configured proposed chat or automatically instantiate a chat session based on the extracted features, modify or present one or more chat icons or chat graphical user interface objects, and the like.

The system 100 may employ any suitable machine learning including one or more of: supervised learning (e.g., using logistic regression, back propagation neural networks, random forests, decision trees, etc.), unsupervised learning (e.g., using an Apriori algorithm, k-means clustering, etc.), semi-supervised learning, reinforcement learning (e.g., using a Q-learning algorithm, temporal difference learning, etc.), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminant analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolutional network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, boostrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) can be used in generating or extracting feature data from email communication data (or electronic message data) via the system 100 (and/or the methods 200 and 300).

The grouping engine 118 includes a grouping server and a grouping database. The grouping engine 118 may enable cohort detection functionality that enables the grouping server to generate or suggest one or more groups or individuals for a chat communication session, as described in U.S. Provisional Application No. 62/581,215, which is incorporated by reference in its entirety. Additionally, or alternatively, the cohort detection functionality may be implemented to identify any type of appropriate affiliate based on an identified electronic communication including, but not limited to, any associate of a recipient of the communication, one or more known or prospective collaborators of the recipient, one or more teams (e.g., baseball team, legal team, marketing team, etc.) associated with the recipient, and the like. Specifically, the grouping engine 118 functions to generate or receive an analysis of an inbound email communication and based on the analysis, determine one or more cohorts including one or more persons, teams, entities (e.g., organizations, etc.) and/or groups that a user should evaluate for a potential chat communication session. These identified one or more persons and/or groups may be associated or linked to a recipient user of an email communication as a cohort, an associate, a team member, and/or a collaborator.

The plurality of mail servers 120 may include a plurality of mail servers maintained by a plurality of disparate entities. The mail servers 120 may include outgoing mail servers, such as Simple Mail Transfer Protocol (SMTP) servers, and incoming mail servers, such as Post Office Protocol (POPS), and Internet Message Access Protocol (IMAP). The plurality of mail servers 120 should not be limited to the example mail servers described above and can be encompassed by any suitable mail server.

The plurality of client devices 130 may include one user devices connected over a network (e.g., the Internet) to the email integration platform 110. Additionally, or alternatively, each of the plurality of client devices 130 may include a (email and/or chat) client application instance hosted thereon that operates in cooperation with a chat client server or the like to enable chat functionality and related capabilities between client devices 130. The plurality of client devices 130 of the user may include any type of device (e.g., a mobile computing device, a desktop device or laptop, etc.) capable of receiving and presenting a content of the inbound email communication to a user. For instance, the plurality of client devices 130 may include, but are not limited to, mobile computing devices (e.g., mobile phones, tablets, etc.), desktop computers or laptops, virtual and/or personal assistant devices (e.g., Alexa, Google Home, Cortana, Jarvis, etc.), chatbots or workboats, etc. The intelligent personal assistant devices (e.g., Alexa, etc.) may be any type of device capable of touchless interaction with a user to performing one or more tasks or operations including providing data or information and/or controlling one or more other devices (e.g., computers, email interfaces, etc.). Thus, an intelligent personal assistant may be used by a user to perform any portions of the methods described herein, including the steps and processes of method 200 and/or method 300, described below. Additionally, a chatbot or a workbot may include any type of program (e.g., slack bot, etc.) implemented by one or more devices that may be used to interact with a user using any type of input method (e.g., verbally, textually, etc.). The chatbot or workbot may be embedded or otherwise placed in operable communication and/or control of a user client device and thus, capable of performing many of the steps and processes of the method 200 and/or method 300 described below including, but not limited to, acquiring and providing information (e.g., email data) and performing one or more control operations (e.g., triggering a chat request or session, pushing notifications, etc.). The plurality of client devices 130 may be operable to implement an email client application or email browser that enable the client devices 130 to receive, interact with, and transmit email communications.

2. Method for Implementing Intelligent Chat Communications

Figure 2:
FIG. 2 illustrates a method 200 in accordance with one or more embodiments of the present application.

As shown in FIG. 2, a method 200 for implementing intelligent chat communications within an email environment includes retrieving an inbound email communication from an email server S202, generating overlay data for the inbound email communication S204, initiating a chat communication S210, identifying chat communication parameters S220, storing chat communication request and pushing a chat communication notification S230, and implementing a chat communication session S240.

In preferred embodiments, the method 200 functions to enable intelligent chat communications (chat messaging) within an email environment (e.g., email application and the like) to reduce an amount of email communications being exchanged between communicating parties and improving an efficiency of communicating within the email environment. Specifically, the method 200 preferably identifies inbound email communications associated with a user's email account and augments the email with chat communication features, capabilities, and resources that allows the user to attend to the email communication with chat communications.

S202, which includes retrieving an email communication from an email server, functions to identify an inbound email communication from a sender being hosted on a remote email server and pull the inbound email communication for processing prior to transmitting the inbound email communication to a user client device associated with the intended recipient of the inbound email communication. S202, may identify the inbound email communication in any suitable manner including by periodically or continuously checking the email server for new inbound email communication, receiving a notification (e.g., a push notification) from the email server that a new inbound email communication is available for retrieval, in response to a user request for inbound email communications, and the like.

Processing the inbound email communication preferably includes retrieving the inbound email communication to an email processing server (e.g., an API server) or the like and generating overlay data that is subsequently merged with the inbound email communication data at step S204, as discussed in more detail below. Accordingly, the email processing server may function to transform the inbound email communication by merging the inbound email communication with the generated overlay data into a format that is most suited to an email application instance or browser of a client device of the user.

The overlay data generated by the email processing server may include any form or type of data to be included with the inbound email communication. In a preferred embodiment, the generated overlay data includes email formatting data as well as metadata generated based on a content and email data of the inbound email communication. Accordingly, the generated overlay data may be used to construct the format of the email communication as well as enable intelligent chat communication capabilities. In some embodiments, the overlay data includes chat features that enables a user within the email environment to compose a chat communication, construct or initialize a chat communication, respond to a proposed chat communication, and/or otherwise, features and capabilities that enable a user to attend to an email communication using chat messaging capabilities within the email environment.

For instance, in step S202, the email processing server may analyze the email communication data including the header information, sender data, originating IP address, and body or content of the email communication to determine and/or generate overlay data and/or metadata to be transmitted with the inbound email communication. Based on the analysis of the email communication, at step S204, the email processing server or an associated chat server may generate metadata and provide functionality that enables a plurality of chat communication capabilities and features for the inbound email communication.

As an example, as a result of an analysis of the inbound email communication, the email processing server may identify that: 1) the content of the email may warrant a response from the recipient and therefore, provides an indication to an associated chat communication server to provide chat data and chat objects to be included in the overlay data and 2) the content of the email includes key terms, language, media (images or video), and the like that identifies subject matter, topics, categories, persons or groups that may be relevant to a prospective chat session and provide the email analysis details to the chat communication server as well as a grouping server to obtain additional chat data and chat objects to be included in the overlay data. Additionally, or alternatively, other information identified during the analysis of the inbound email communication may include source information or network address information, such as a public IP address or a private IP address, indicating a source of the email communication. This information may, in turn, may be used in any manner including to inform or define suggestions for implementing a chat session to a recipient of the email communication. For instance, if the analysis indicates that the IP address of the sender of an email communication is in a time zone with a twelve-hour time differential from the recipient's time zone, a system implementing S202 may suggest transmitting the chat request at a suitable time, with a delay, or within a suggested time frame (e.g., during working recipient's working or operating hours) for conducting the chat session.

At step S204, the chat communication server and the grouping server may be able to generate "@" mention suggestions (e.g., @johndoe) or an "@" mention suggestions list of one or more teams (e.g., @legal team, @marketing team, @baseball team, etc.) and/or one or more people (e.g., @john, @jane, etc.) for a prospective chat communication for the inbound email communication based on the analysis of the email processing server. For instance, key terms such as "law" and "contract" may trigger a generation by the grouping server of a suggestion to provide an "@" mention of "@legal" or "@legalcounsel" that, if entered as input into a chat communication interface would provide a notification to an associated resource, person, entity, or team and/or pull in an associated resource or person linked with or associated with the "@" mention to discuss the subject matter of the inbound email. Additionally, or alternatively, the sender of the inbound email may be indicated as "John" in the email header information and a recipient copied to the email may be indicated as "Jane" to the chat communication server in which case, the chat communication server may generate suggestions of "@John" and "@Jane" to include in the overlay data that is merged with the inbound email communication for identifying potential candidates to initiate a chat communication with. It shall be noted that while in one or more exemplary embodiments it may be preferable to utilize an "@" mention feature to notify and/or invite another user or group/team to a chat session, any suitable means may be used to notify, draw attention to, or invite another user or group/team to a chat session including, but not limited to, tagging, using a "+" sign (e.g., Google+, +johndoe, etc.), sending a chat link, a drop-down autocomplete list, and the like. Thus, S204 may function to generate a chat communication suggestion list or the like with varying means to pull another user, team, (computing) resource, and/or team into a chat session.

Additionally, or alternatively, S204 may function to generate overlay data that includes one or more suggestions of chat types to initiate by the recipient. S204 may function to generate overlay data based on chat features extracted from the email communication data. In a preferred embodiment, an overlay generation module may function to map chat features extracted from the email communication data to one or more of a plurality of distinct chat types. The chat types may include, but are not limited to, a chat on email, a chat on draft, a chat on person, a chat on teams, a chat on (email) topic, and/or the like. Accordingly, if one or more chat features extracted from the email communication data predominantly map to a specific chat type (e.g., three chat features map to a chat on person chat type), S204 may generate overlay data that proposes initiating or automatically initiates a chat session (e.g., when the email is opened, etc.) of the chat on person chat type (e.g., Start "Chat with Lindsay" because several extracted chat features from the email communication data related to or included the person "Lindsay").

Accordingly, S202 may function to transformatively process the inbound email communication to be merged with overlay data and transmit the transformed email communication to a client device of a recipient user. The client device of the user may be any type of device (e.g., a mobile computing device, a desktop device or laptop, etc.) capable of receiving and presenting a content of the inbound email communication to a user.

S210, which includes initiating a chat communication, may function to enable a client device to initiate a chat communication based on an email communication or automatically, initiate or propose a chat based on an email communication or the like. Specifically, in response to user input, the client device may trigger a request for a chat communication. The chat communication request may be transmitted to a chat server for processing and initializing a chat communication session with a prospective chat participant. The user may provide input to the client device in any suitable manner including via text or typed input, voice input, gesture input, or any other suitable form of input observable by the client device for initiating the chat communication request.

Figure 4:
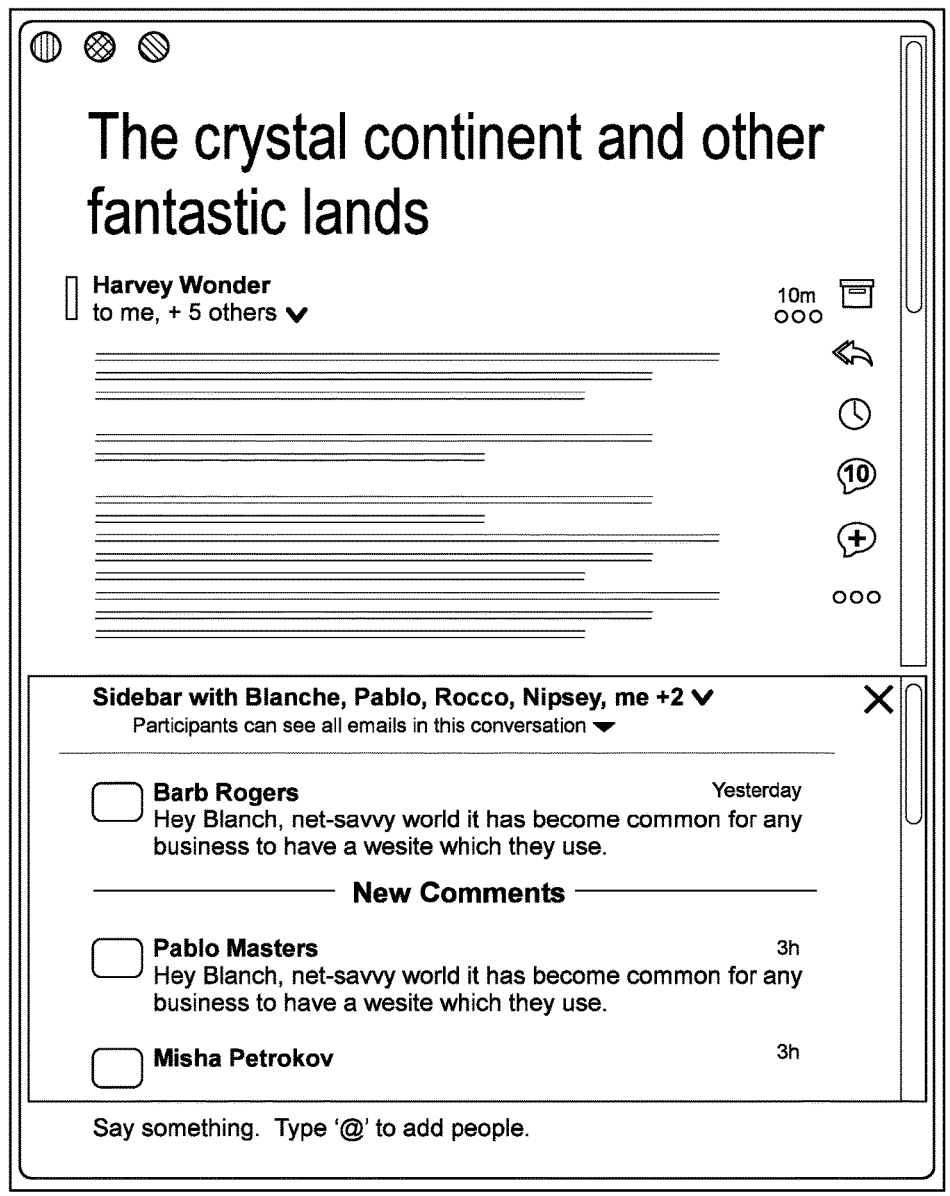
FIG. 4 illustrates an example user interface in accordance with one or more embodiments of the present application.

For instance, in a preferred embodiment, an inbound email with overlay data may be provided to an email application instance of a mobile device of a user, which displays the inbound email via a display screen of the mobile device. The display screen may display an email environment including traditional interface components and command objects of an email environment, such as an email list and selectable features (commands, etc.) (e.g., Inbox, Drafts, Sent, etc.) for interacting with email communications accessible via a user's account. Within an email viewport of the email environment, content of the inbound email may be presented (when the email is selected by the user) together with a plurality of instruments or selectable user interface objects (e.g., chat icons, etc.) that enable a user to provide a selection input to initiate a chat communication. As shown in FIG. 4, a selectable chat icon or UI object may be incorporated within or integrated with the viewport and positioned immediately adjacent or proximate to the text content or a text area of a selected email communication. Selection of the chat icon or the like may trigger a signal to the client device to transmit a chat communication request to a chat server for initiating chat functionality for the selected email.

Figure 6:
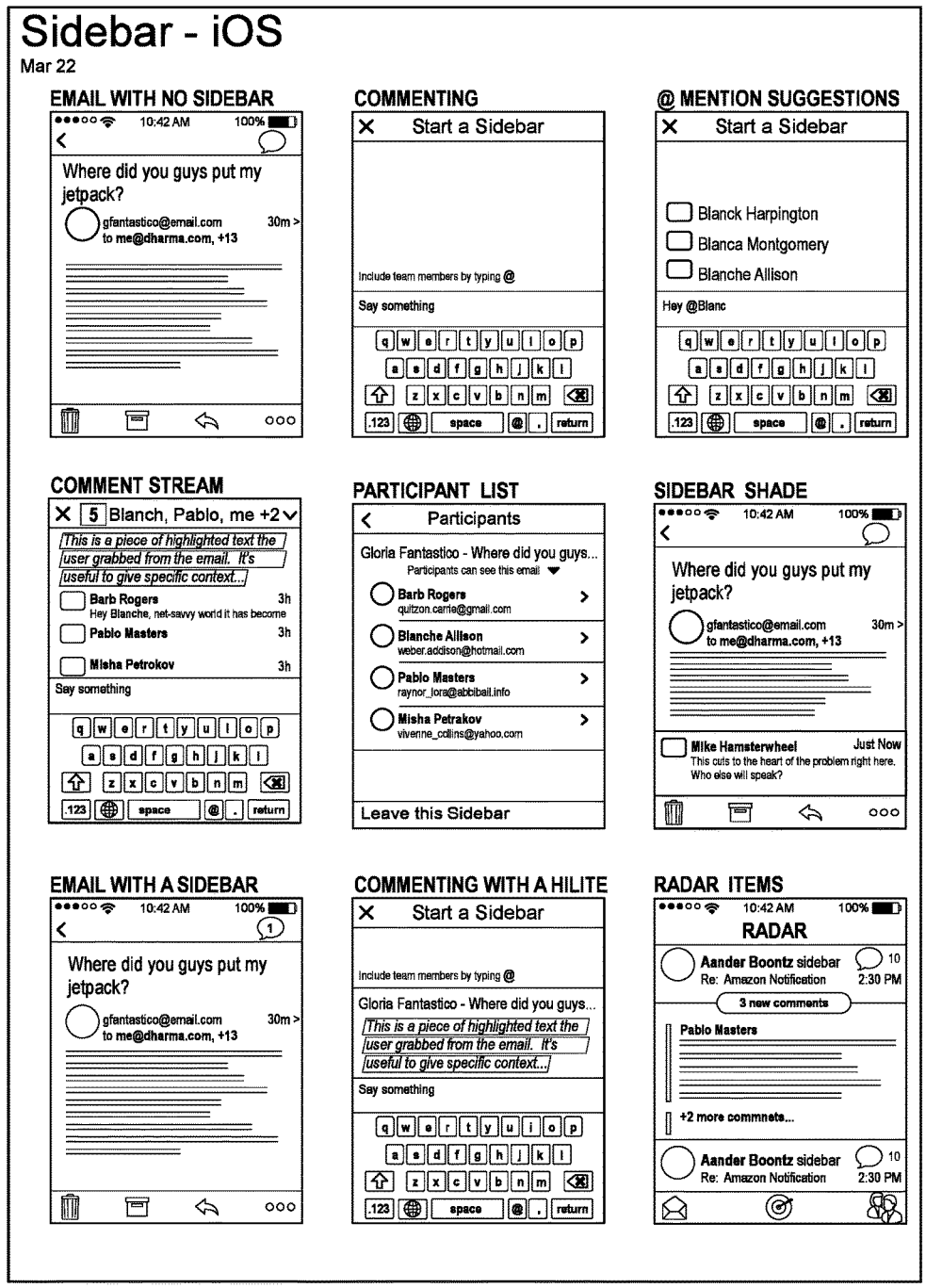
FIG. 6 illustrates an example implementation of a chat communication in accordance with one or more embodiments of the present application.

The chat communication request may also function to activate chat alerting mechanisms including "@" mentions capabilities of the chat communication features within the email environment, as shown by way of example in FIG. 6.

Additionally, or alternatively, in a case of a voice-assisted virtual assistance (e.g., Alexa, Google Home, etc.), based on an identification or a selection of the inbound email, the virtual assistance may audibly (or using any communication means available to the virtual assistant (e.g., projection)) indicate that the email includes proposed chat functionality or an option for chat functionality and inquire as to whether the user of the virtual assistance would like to initiate a chat. Thus, voice input to initiate a chat communication may be provided by a user via a communication interface of the virtual assistant. It shall be noted that any suitable intelligent personal assistant device may be implemented including, but not limited to, Alexa, Cortana, Google Home (Google Assistant), Siri, Jarvis, and the like. Additionally, or alternatively, any type of input from a user may be recognized for triggering and/or conducting a chat request and/or chat session including input via an I/O device, gesture input, voice input, haptic input, and the like.

Figure 5:
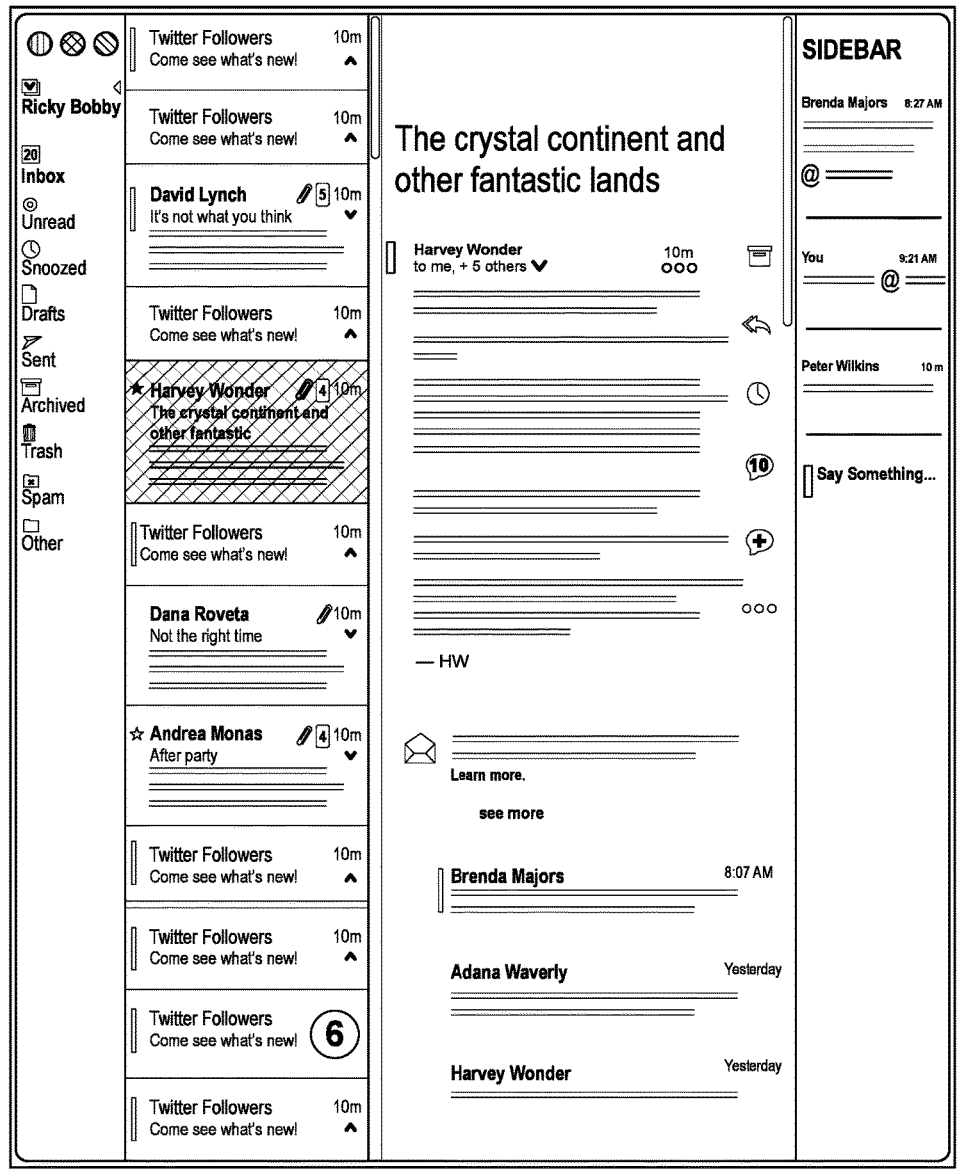
FIG. 5 illustrates another example user interface in accordance with one or more embodiments of the present application.

In a second implementation of S210, the chat communication request may be initiated based on a selection of content or text of a selected email. For instance, upon selecting or highlighting text of an email within an email viewport or the like, as shown in FIG. 5, or selecting a portion of a precis of the email a chat initialization option may be automatically presented within the email environment to initiate a chat communication on or about the selected (e.g., highlighted, underlined, pointed to, selected with a right-click of an input device, etc.) text. The highlighted or selected content of the email initiating the chat communication window or section may additionally be automatically copied or translated to a body of the chat communication window or section so that any participants may view only the selected section of the subject email. Thus, highlighting content (e.g., email message content, header content, etc.) or content selection of an email may serve a dual purposes of initiating a chat communication window and, limiting the content of the subject email shared with participants of the chat communication other than the original recipient user. The chat initialization option automatically presented may be a selectable UI object that, when selected by a user, automatically triggers an opening of a chat window that may be positioned within the email viewport, adjacent, or proximate to the email viewport. In one variation, the selection or marking of content or text of a selected email may cause an animation (e.g., cause the chat icon to flash or periodically, grow large and shrink small, etc.) or an indicator (e.g., highlight the chat icon blue) to be applied to a preexisting chat icon that is persistently displayed within the email environment. Additionally, or alternatively, selecting the content of the email may automatically cause a generation of the chat communication window, chat communication section (within or outside of the email viewport), and the like.

In another variation, a user may initiate a chat communication or generate a chat communication request by first selecting a chat icon or UI object and then selecting another UI object or content within the email environment or within the email viewport (or vice versa). The subsequent selection of the UI object or content may define a chat type and/or a title for the chat communication. For instance, after selecting the chat icon, the user may select a name of a sender within the email header or email body; the user may select a portion of a text of the email or an image (or video) within the email, any of the fore-mentioned being sufficient to automatically trigger a chat communication request and preferably, establishment of a chat communication section or window.

In a third implementation of S210, based on email data associated with an inbound email communication, S210 may automatically suggest initiating a chat communication to attend to the email. For instance, upon selection of an email within an email environment, S210 may automatically suggest, via the display (or via any communication form factor), to initiate a chat communication for resolving the email. Additionally, or alternatively, S210 may automatically display a chat communication window in response to the selection of an email.

The email data, which may include the email header information, email body, and any related content of the email, may be analyzed by a chat server or email processing server and the resulting analysis may be sufficient to require or trigger a proposal of a chat communication when interacting with a corresponding email communication. For instance, a chat server of a system implementing method 200 may analyze an email to determine a chat communication score. The chat communication score may indicate whether an inbound email communication should require an automatic chat communication request prompt (or an automatic chat communication window) or not. In a preferred embodiment, S220 may function to generate the chat communication score and compare the chat communication score to one or more chat thresholds. If the chat communication score satisfies an automatic chat threshold, S220 may function to automatically propose a chat, initialize a chat window/section or generate a chat prompt (based on a selection or interaction with the email within the email environment). Similarly, if the chat communication score satisfies a general chat threshold, S220 may function to prominently or otherwise, present chat options (e.g., presentation of a chat icon within the viewport, toggling an appearance of a chat icon, or the like) to a user (e.g., within the email viewport, over or adjacent specific text, etc.). The chat communication score may be based on a variety or combination of chat initiation factors obtained from email analysis (and/or user preferences) including, historical user data (e.g., historical user chat data), historical interaction data between user and sender (e.g., historical chat data between the user and sender), based on the content of the email (e.g., key terms, tone of message, sender-recipient history, estimated sender-recipient relationship, issues or subject matter within the email that automatically trigger a chat communication request prompt), a number of recipients of the email, an express request in the email to attend to the message via chat communication, and the like.

S220, which includes identifying chat communication parameters, functions to identify (or select) a chat communication type and/or one or more participants for a chat communication. The chat communication parameters preferably relate to or indicate a chat communication type, prospective participants of a chat communication, a proposed subject/topic/chat header of a chat communication, a chat timing (e.g., a start time for the chat session, chat session period, etc.), chat session security (e.g., enhanced security for chatting on sensitive topics or data, enhanced encryption of chat session, etc.) and various parameters defining a chat communication and/or chat communication session. The chat communication type may be selected from among a plurality of chat communication types including one or more of chat on email, chat on draft, chat on people, chat on teams, and chat on organizations. It shall be noted that the chat type may include chats on any suitable category or subject and should not be limited to the above-noted examples. Additionally, or alternatively, the communication chat type may be automatically suggested based on email analysis data of a subject or selected email communication data. The participants for a chat communication may be selected by a user or identified automatically by a system implementing S220 based on email analysis data. For instance, the email analysis data may include data features extracted from content of an email communication that may indicate that a conversation surrounding a predefined group is made within the email communication. In this instance, S220 may function to identify the group based on the extracted data features provided with the email analysis data and map the identified group to identities of the members of the group. Once the identities of the members are known, S220 may function to propose as potential participants of a chat session, the group of users or the individual members of the group.

A chat on email type of chat communication may include a chat communication requests that seeks to initiate a chat session that relates to or is prompted by content and/or associated data of an inbound email (or subject email). Preferably, the chat on email enables a user to attend to a selected email by interacting with one or more participants (e.g., sender of the email, user's assistant, user's teams, etc.) via chat communication rather than by sending an email response in reply to the selected email communication. This, in turn, reduces an amount of email communications in a sender's and/or recipient's email account or inbox because the selected email was attended to via chat messaging.

Once a chat communication is initiated, S220 may electronically associate or link within a chat database the chat on email data with the selected email for which the chat on email was spawned. A similar link or association may be established for any of the other chat communication types including chat on draft, chat on person, and the like. S220 may function to associate or link the chat stored within a chat database or server with the email spawning the chat that is stored at the email server.

A chat on draft type of chat communication may include a chat communication requests that seeks to initiate a chat session for preparing a draft email typically in reply to a selected inbound email. This chat communication type allows a recipient of the selected email to pull in one or more additional participants to collaborate on a draft email response to the selected email. With this chat communication type, a chat communication interface or section may be generated together with a blank email template on which the participants of the chat on drafts can communication as well as collaboratively generate content for the draft email reply. In some embodiments, the chat on drat type of chat communication enables the participants of the chat communication to collaboratively generate email content within the chat communication window or section. That is, any participants of the chat on draft may add proposed content in real-time and edit or change proposed email content of other participants that are added to the window or composition area of the chat on drafts.

A chat on teams type of chat communication may include a chat communication request that seeks to initiate a chat session based on one or more predetermined groups or teams associated or otherwise, affiliated with the sender or recipient of the email communication. For instance, a subject matter of an email communication may be related to a potential Series A venture capital investment into a cool email and email data startup. In such instance, S220 may identify a chat on teams type of chat communication to initiate an investors team chat session for the email communication.

A chat on organization type of chat communication may include a chat communication request that seeks to initiate a chat session based on one or more organizations or companies. As an example, if an email is sent to a recipient from Company A, then S220 may identify a chat on organization type of chat communication to initiate a chat on organization type of chat communication.

With respect to each of the plurality of chat types, upon initializing a chat and initiating a chat communication with one or more participants of the chat communication, the email, emails, or email chain spawning the chat communication may be automatically shared and viewable to the participants of the chat communication session. In a preferred embodiment, a copy of the email communication(s) linked to or spawning the chat communication may be presented via the chat communication window or section of the various participants, such that the participants who do not have direct access to the email communication within their inboxes may select and review the email within the chat communication window or section. In such preferred embodiment, the email communication is not duplicated to the inbox of the participants of the chat but only replicated within the chat communication. Accordingly, in some embodiments, the original email content may only be made viewable or available via the chat communication window or only when the chat communication session is live. That is, the original email that is shared to the participants of the chat communication session is preferably not shared outside of the chat communication session and, is not stored to the inboxes or email accounts of the participants. Thus, S220 may actively restrict an ability of participants of a chat communication session to further replicate content or data of the email communication beyond a chat window or chat section.

A chat on person type of chat communication may include a chat communication requests that seeks to initiate a chat session for the exchange of data associated with a person (e.g., contact information, etc.). The person may be a person who is a subject of an inbound email, a sender of the inbound email, a person copied to an inbound email, or the like. A user or recipient of the inbound email may preferably hover a cursor or otherwise, select a person (or person's name in the email) in order to initiate a chat on person type of chat communication. By selecting the person, S220 may automatically present information associated with the person that may be used as input in a chat on person type of chat communication and transmitted to a participant of the chat on person.

As mentioned above, S220 may function to automatically suggest and/or generate chat communication parameters for a chat communication session based on one or more chat initiation factors and/or chat data features extracted from email communication data (e.g., content of an email communication, metadata of the email communication, etc.). Specifically, S220 may implement a chat server that functions to generate a list of teams, groups, and one or more that can be "@" mentioned into the chat communication session based on chat initiation factors identified in one or more of the email analysis data of a subject email and user data (e.g., historical data about the use of the email environment and chat functionalities).

In a preferred embodiment, S220 may implement the chat server in cooperation with a machine learning system that includes an ensemble of machine learning classifiers (e.g., labeling models) as well as an ensemble of machine learning models (e.g., predictive models). S220 may implement the ensemble of machine learning classifiers to generate classification labels for distinct data features of email communication data. In some embodiments, the ensemble of machine learning classifiers comprises a plurality of distinct machine learning classifiers that each were specifically trained to detect and generate a label for one or more specific or distinct (chat-related) data features from electronic messaging data. Additionally, or alternatively, S220 may function to implement the ensemble of machine learning models to generate suggestions for chat communication parameters based on an input of email communication data or an input of select features of the email communication data. In some embodiments, the ensemble of machine learning classifiers comprises a plurality of distinct machine learning models that each were specifically trained to generate distinct (chat parameter) suggestions based on specific or distinct features extracted from electronic messaging data.

S220 may function to automatically populate the suggested list of chat participants within a chat communication window based on a selection or identification of a subject email by the user. For instance, once the user selects an email to attend to, the system implementing S220 may populate the suggested list of chat participants or a list of proposed participants that a user may select from to automatically initialize a chat session with the selected participants. Additionally, or alternatively, the suggested list of participants may be selectively populated within the email environment (e.g., within the email viewport) or within the chat communication window based on a selection of a chat icon or chat window object. For instance, the suggested list of participants may be populated within the chat window based on a selection of a dropdown arrow within a chat window. In another example, the suggested list of participants may be populated within the email viewport based on a selection of chat icon (e.g., chat bubble) which then displays a list of suggested or prospective participants for the chat communication. Additionally, or alternatively, S220 may function to automatically populate a suggested list of chat participants based on prior communications of the recipient and/or prior communications of one or more cohorts or teams of the recipient. Thus, S220 may function to generate a suggested list of participants on any basis and not only based on solely a subject or an email (e.g., inbound email communication).

Additionally, S220 enables a user to identify chat communication parameters for a plurality of chat communications. That is, S220 functions to enable a user to initialize multiple chat sessions spawned by a selection of a single email (or a plurality of emails). Thus, a user may initiate a chat communication that is a chat on email type to discuss subject matter of a selected email and a second chat communication that is a chat on draft type that automatically populates a blank draft email document and a chat window or chat section to collaborate on a draft response to the same selected email. The chat on email and the chat on drafts may be implemented within two different sections of the email environment and possibly adjacent to related email content or data that spawned the specific chat communication. For instance, the chat on drafts may be implemented within a portion or section of the email viewport whereas the chat on email may be implemented via a section of the email environment outside of the viewport and proximate to or adjacent the email viewport. It shall be noted that the chat communication windows may be located at any section or portion of the email environment interface and should not be limited to the sections described in the examples discussed above.

S230, which includes storing chat communication request and pushing a chat communication notification, functions to transmit the chat communication from the senders or initiators to attempt to establish a chat communication session with the identified one or more participants of the chat communication. Specifically, once chat communication parameters are provided for instantiating and/or initializing a chat communication, S230 may function to transmit the chat communication from the client device of the user to a chat server that stores the chat communication and associated chat data within a chat queue of a chat database. The chat communication may remain within the chat queue until the chat communication is attended to by the one or more participants of the chat or until an expiry event (e.g., an elapsed of a predetermined period of time or period of decay, deletion of the selected email spawning the chat, after a reply to the spawning email, etc.). The chat server may perform several functions, in parallel, with the storage of the chat communication including transmitting a push notification to each of the client devices associated with the prospective participants of the chat communication session and generating an association or link between the chat communication in the chat database and the selected email of the chat communication that is stored in the remote email server.

The push notification to the client devices of the prospective participants of the chat communication session functions to alert the prospective participants about the pending chat communication. For instance, the push notification may be sent to an email application instance, chat application instance, or email browser of a client device. The push notification may provide data describing the chat communication and one or more chat access features that the participant can select or use to access the chat communication. The push notification may also indicate one or more expiry events that may cause the chat communication to be deleted and/or no longer be available to the prospective participant.

The generated association or link between the chat communication may function to bind the disposition of the chat communication to a disposition of the subject email which initiated the chat communication. For instance, if or when the subject email is deleted, replied to, and/or modified in some regard, the chat communication stored in the chat database may similarly be deleted and/or modified because of the link or association between the chat communication and the subject email. Accordingly, if at any point the recipient user severs the association or link between the email communication and the chat communication, the chat communication may be automatically deleted from the chat database.

S240, which includes implementing a chat communication session, functions to initialize a chat communication session based on a response to the push notification by each of the proposed participants of the session.

S240 functions to deploy to an interface of a client device of a participant the chat communication and one or more portions of the email or the entire email within an email environment provided by the client device. The chat communication and associated subject email portions may be presented via the client device interface in any suitable manner or manner described herein or illustrated by one or more of the figures of the present application.

Figure 3:
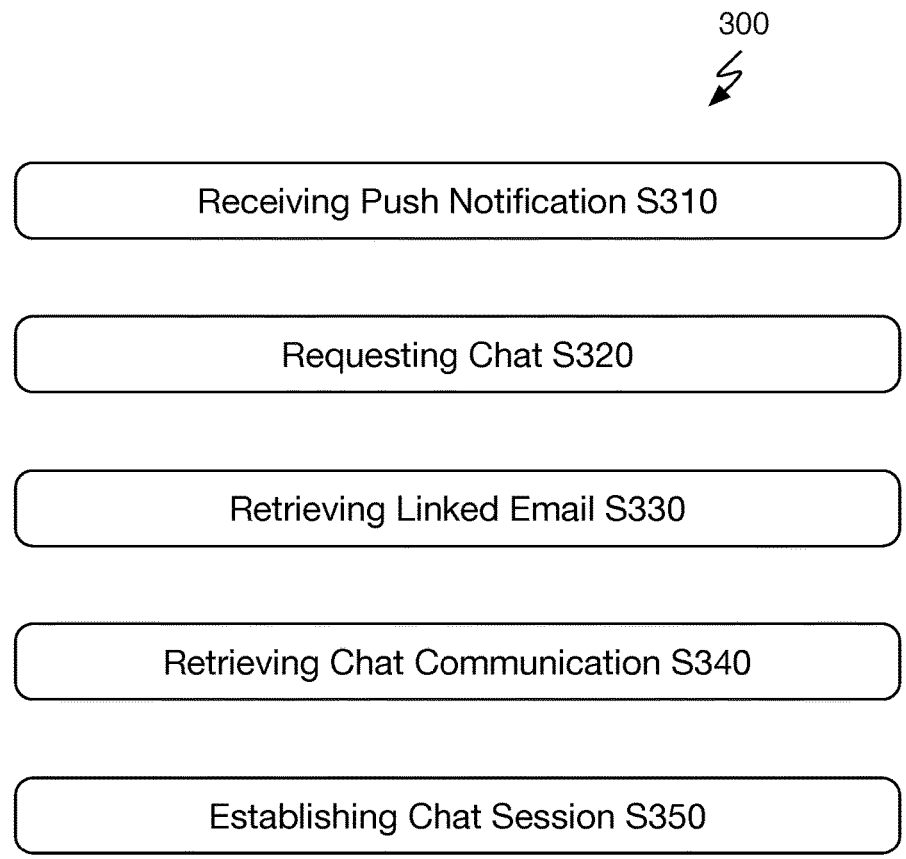
FIG. 3 illustrates a method 300 in accordance with one or more embodiments of the present application.

As shown in FIG. 3, a method 300 for processing a chat communication request at a recipient device includes receiving a push notification for establishing a chat communication session S310, requesting email/person/draft w/chat attached S320, retrieving email associated with the chat session from a mail server of the initiator of the chat communication session S330, retrieving chat communication from a chat database S340, and establishing the chat communication session S350.

S310, which includes receiving a push notification for establishing a chat communication session, functions to receive at a client device of a prospective participant of a chat communication session. The push notification may serve as an indicator or alert that both notifies the participant of the pending chat communication as well as an access point for joining the chat communication session.

S320, which includes requesting email/person/draft/teams/organization w/chat attached, functions to allow the prospective participant to use the client device to engage into or join the chat communication session. Specifically, by selecting one or more features or interacting with the push notification to positively join the chat communication session, may function to trigger a request to retrieve the chat communication together with any associated attachments or content of the chat communication.

S330, which includes retrieving email communication and chat communication, functions to retrieve from the email server a subject email that is linked or associated with the chat communication. S340 functions to retrieve from a chat database the associated chat communication. S350, which includes establishing the chat communication session, functions to establish the chat communication session by joining the retrieved chat communication and linked email communication prior to transmitting or pushing the joined chat and email communication to a client device of each of the participants of the chat communication session.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the claims.

What is claimed is:

1. An online system that enables intelligent chat messaging within an email environment based on email communication data, the online system comprising:
an email integration server that collects from a mail server email communication data relating to an inbound email communication;
an email processing circuit that processes the inbound email communication by:
(i) extracting chat data features from the email communication data;
(ii) providing the extracted chat data features, as input, into a chat messaging circuit;
wherein the chat messaging circuit uses the extracted chat data features to generate chat communication parameters that define one or more configurations for a chat communication relating to the inbound email communication;
a chat messaging server that implements the chat communication within the email environment based on the generated chat communication parameters; and
a chat feature extractor comprising:
a machine learning system comprising an ensemble of machine learning classifiers comprising a plurality of distinct machine learning classifiers, wherein each of the plurality of distinct machine learning classifiers is configured to generate a distinct classification label upon a detection of a distinct chat data feature,
wherein processing the inbound email communication includes:
generating by the plurality of distinct machine learning classifiers one or more chat feature classification labels tar one or more distinct data features of the email communication data; and
wherein providing the extracted chat data features to the chat messaging circuit includes providing the one or more chat feature classification labels along with the extracted chat data features.

2. The system according to claim 1, further comprising: a chat scoring circuit that: generates a chat communication score based on the extracted chat data features; identifies whether the chat communication score satisfies one at a plurality of chat communication thresholds, wherein if the chat communication score satisfies a first chat communication threshold of the plurality of chat communication thresholds, automatically proposing the chat communication via the email environment when the inbound email communication is selected.

3. The system according to claim 1, further comprising:
a chat overlay module that:
generates chat overlay data comprising a plurality of chat messaging features based on an analysis of the email communication data;
integrates the chat overlay data with the email communication data with a plurality of chat functionality based on an analysis of the email communication data, wherein augments an instrumented email viewport within the email environment with a selectable chat graphical object that initializes a chat communication based on the inbound email communication.

4. An online method that enables intelligent chat messaging within an email environment based on email communication data, the online method comprising:
collecting by an email integration server email communication data relating to an inbound email communication;
extracting by one or more processing circuits chat data features from the email communication data;
providing the extracted chat data features, as input, into a chat messaging circuit;
using the extracted chat data features to generate by the chat messaging circuit chat communication parameters that define one or more configurations for a chat communication relating to the inbound email communication; and
implementing the chat communication within the email environment based on the generated chat communication parameters;
a chat feature extractor comprising:
an ensemble of machine learning classifiers comprising a plurality of distinct machine learning classifiers, wherein each of the plurality of distinct machine learning, classifiers is configured to generate a distinct classification label upon a detection of a distinct chat data feature,
wherein extracting the chat data features includes:
providing the email communication data, as input, into the chat feature extractor;
generating by the plurality of distinct machine learning classifiers one or more chat feature classification labels for one or more distinct data features of the email communication data;
wherein providing the extracted chat data features to the chat messaging circuit includes providing the one or more chat feature classification labels along with the extracted chat data features.

5. The method of claim 4, further comprising:
generating by an email integration server overlay data comprising formatting features that enable chat capabilities for the inbound email communication when the inbound email communication is selected and opened within an email viewport; and
integrating the generated overlay data with the email communication data.

6. The method according to claim 4, further comprising:
generating a chat communication score based on the extracted chat data features;
identifying whether the chat communication score satisfies one of a plurality of chat communication thresholds,
wherein if the chat communication score satisfies a first chat communication threshold of the plurality of chat communication thresholds, automatically proposing the chat communication via the email environment when the inbound email communication is selected.

7. The method according to claim 6, wherein
automatically proposing the chat communication includes:
selecting a chat type from a plurality of distinct chat types for the chat communication based on the chat communication parameters;
selecting one or more chat participants for the chat communication based on the chat communication parameters.

8. The method according to claim 7, wherein
the plurality of distinct chat types includes two or more of:
a chat on draft comprising a chat communication configured for exchanging chat messages between participants regarding a generation of a draft response email that attends to the inbound email communication;

a chat on teams comprising a chat communication configured for exchanging chat messages between participants that are members of a recognized team that attends to the inbound email communication;

a chat on person comprising a chat communication configured for exchanging chat messages between participants regarding a person identified from the email communication data that attends to the inbound email communication; and a chat on email comprising a chat communication configured for exchanging chat messages between participants regarding content of the inbound email communication that attends to the inbound email communication.

9. The method according to claim 4, further comprising:

integrating a selectable chat initialization object into an instrumented email viewport, wherein the chat initialization object when selected activates a chat communication window or a chat communication section for the chat communication within the email environment.

10. The method according to claim 9, wherein implementing the chat communication is based on a first selection input of the chat initialization object within the email environment and a second selection input of content from the inbound email communication.

11. The method according to claim 9, wherein implementing the chat communication is based on a first selection input of content from the inbound email communication and a second selection input of the chat initialization object within the email environment.

12. The method according to claim 9, further comprising:

in response to placing the inbound email communication within the email viewport, automatically toggling a chat initialization object from a first appearance to a second appearance that indicates an availability of the chat communication based on the chat communication parameters.

13. The method of claim 4, wherein generating chat communication parameters include:

identifying a chat communication type from a plurality of distinct chat communication types based on the email communication data; and identifying one or more participants distinct from the recipient of the email communication as proposed participants of the chat communication based on the email communication data.

14. The method of claim 4, further comprising:

in response to implementing the chat communication, electronically associating chat communication data derived from the chat communication with the inbound email communication.

15. The method of claim 4, further comprising:

providing a copy of the inbound email communication within a chat communication window or a chat communication section of the chat communication, wherein the chat communication window or the chat communication section is distinct from the email viewport.

16. The method of claim 4, further comprising:

in response to initializing the chat communication, automatically populating a list of proposed chat participants within a chat communication window or a chat communication section based on the chat communication parameters.

17. The method of claim 4, further comprising:

in response to initializing the chat communication, enabling @mention functionalities for the chat communication allowing users to notify and/or invite a participant to the chat communication.

18. An online method that enables intelligent chat messaging within a networked computer communication environment based on electronic messaging data, the online method comprising:

collecting, by an electronic messaging integration server, electronic message data relating to an inbound electronic message;

extracting, by one or more processing circuits, chat data features from the electronic message data;

providing the extracted chat data features, as input, into a chat messaging server;

using the extracted chat data features to generate, by the chat messaging server, chat communication parameters that define one or more configurations for a chat communication session relating to the inbound electronic message; and implementing the chat communication session within the networked computer communication environment based on the generated chat communication parameters;

a chat feature extractor comprising:

an ensemble of machine learning classifiers comprising a plurality of distinct machine learning classifiers, wherein each of the plurality of distinct machine learning classifiers is configured to generate a distinct classification label upon a detection of a distinct chat data feature, wherein extracting the chat data features includes:

providing the electronic message data, as input, into the chat feature extractor;

generating by the plurality of distinct machine learning classifiers one or more chat feature classification labels for one or more distinct data features of the electronic message data;

wherein providing the extracted chat data features to the chat messaging server includes providing the one or more chat feature classification labels along with the extracted chat data features.

* * * * *

UNITED STATES PATENT AND TRADEMARK OFFICE
CERTIFICATE OF CORRECTION

PATENT NO. : 10,205,695 B2  
APPLICATION NO. : 15/995865  
DATED : February 12, 2019  
INVENTOR(S) : Lindsay Snider, Guy Suter and Ian Berry Page 1 of 1

It is certified that error appears in the above-identified patent and that said Letters Patent is hereby corrected as shown below:

In the Claims

Column 17, Line 37:
In Claim 1, delete "tar" and insert --for-- therefor

Column 17, Line 43:
In Claim 2, after "comprising:", insert --¶--

Column 17, Line 44:
In Claim 2, after "that:", insert --¶--

Column 17, Line 45:
In Claim 2, after "features;", insert --¶--

Column 17, Line 46:
In Claim 2, delete "at" and insert --of-- therefor

Column 17, Line 47:
In Claim 2, after "thresholds,", insert --¶--

Column 18, Lines 20-21:
In Claim 4, delete "learning," and insert --learning-- therefor Signed and Sealed this
Fourteenth Day of January, 2020

Andrei Iancu
*Director of the United States Patent and Trademark Office*